(12) United States Patent
Crepas et al.

(10) Patent No.: US 11,614,455 B2
(45) Date of Patent: Mar. 28, 2023

(54) SYSTEM FOR SHIELDING A TONE RING IN A VEHICLE AXLE

(71) Applicant: Dana Heavy Vehicle Systems Group, LLC, Maumee, OH (US)

(72) Inventors: Robert E. Crepas, Delta, OH (US); Aaron D. Gries, Perrysburg, OH (US); Mark W. Leber, Holland, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 306 days.

(21) Appl. No.: 17/116,889

(22) Filed: Dec. 9, 2020

(65) Prior Publication Data

US 2022/0178962 A1    Jun. 9, 2022

(51) Int. Cl.
*G01P 1/02* (2006.01)
*G01P 3/00* (2006.01)
*B60T 8/32* (2006.01)

(52) U.S. Cl.
CPC ............ *G01P 1/026* (2013.01); *G01P 3/00* (2013.01); *B60T 8/329* (2013.01); *B60T 2270/10* (2013.01)

(58) Field of Classification Search
CPC . G01P 1/026; G01P 3/00; B60T 8/329; B60T 2270/10
See application file for complete search history.

(56) References Cited

U.S. PATENT DOCUMENTS

| | | | |
|---|---|---|---|
| 8,167,762 B2 * | 5/2012 | Zink | B60T 8/329 |
| | | | 475/230 |
| 9,207,102 B2 | 12/2015 | Metzger et al. | |
| 11,498,362 B2 * | 11/2022 | Crepas | B60K 17/165 |
| 2003/0085697 A1 * | 5/2003 | Dobbs | G01P 3/487 |
| | | | 324/207.22 |

OTHER PUBLICATIONS

"Snap-Fit Joints for Plastics—A Design Guide," Bayer Material Science, SparkFun Wesbite, Available Online at https://cdn.sparkfun.com/assets/home_page_posts/1/4/1/0/Plastic_Snap_fit_design.pdf, Available as Early as Aug. 11, 2016, 26 pages.
Crepas, R. et al., "Tone Wheel Assembly, an Axle Assembly Made Therwith, and a Method of Manufacturing an Axle Assembly," U.S. Appl. No. 16/713,214, filed Dec. 13, 2019, 42 pages.

* cited by examiner

*Primary Examiner* — Nathaniel T Woodward
(74) *Attorney, Agent, or Firm* — McCoy Russell LLP

(57) ABSTRACT

A system is provided for shielding a tone ring assembly in automotive vehicles. The system comprises a ring cap with a central aperture, a plurality of molding slides circularly arranged on a first side of the ring cap, a plurality of snap-fit arms and a plurality of pilot tabs positioned on a second side of the ring cap, where the plurality of pilot tabs and the plurality of snap-fit arms are arranged in concentric circles with the snap-fit arms forming an outer circle and the pilot tabs forming an inner circle, and where each pilot tab of the plurality of pilot tabs is positioned directly behind a corresponding snap-fit arm of the plurality of snap-fit arms. In one example, the system prevents metal to metal contact between a tone ring and a shaft during axle shaft installation.

20 Claims, 5 Drawing Sheets

SYSTEM FOR SHIELDING A TONE RING IN A VEHICLE AXLE

TECHNICAL FIELD

The present disclosure relates generally to systems for protecting axle tone ring in automotive vehicles.

BACKGROUND AND SUMMARY

A tone ring, being a part of an anti-lock braking system of a vehicle, is a notched ring that is used in conjunction with a sensor to determine number or speed of revolutions. A tone ring assembly of a vehicle is often susceptible to being struck by an axle shaft during installation. An axle shaft is usually installed in a vehicle after the tone ring is installed on a carrier assembly. While installing the shaft through the tone ring, the shaft may come in contact with the bare tone ring, which can cause damages to the tone ring. This may add cost and complexity to the manufacture and service of the axle assembly. Therefore, an effective system for shielding the tone ring from axle shaft is highly desirable.

An example unitized tone ring assembly system is shown by Dobbs et al. in US 20030085697A1. Therein, an assembly comprising a body of a tone ring and a retainer is described. The retainer is a radial flange that engages with the tone ring and prevents axial movement of the tone ring, allowing ease of installation of axle shaft. Another example tone ring assembly system is shown by Crepas in U.S. Ser. No. 16/713,214. Therein, an assembly is disclosed comprising an inboard tone ring, a first member attached to the tone ring, and a second member partially disposed around a portion of the first member. The second member includes a circular collar portion, a central aperture, and one or more leg portions extending axially from the collar portion.

However, the inventors herein have identified potential problems in the systems such as those noted above. As one example, the systems described by Dobbs et al. and Crepas do not shield the tone ring from an axle shaft, and therefore the tone ring may not be able to withstand reasonable axle shaft impact forces. Moreover, the second member of the tone ring assembly of Crepas neither engages with the tone ring, nor does it include a passage for oil flow. Additionally, the retainer used in the system of Dobbs et al. is only partially disposed around a portion of the tone ring, leaving the rest of the portion of tone ring exposed that may be vulnerable to being struck by an axle shaft during installation.

The inventors herein have recognized the above issues, and others, and have developed a system for shielding a tone ring in a tone ring assembly of a vehicle axle. The system comprises a ring cap with a central aperture, a plurality of molding slides circularly arranged on a first side of the ring cap, a plurality of snap-fit arms and a plurality of pilot tabs positioned on a second side of the ring cap, where the plurality of pilot tabs and the plurality of snap-fit arms are arranged in concentric circles with the snap-fit arms forming an outer circle and the pilot tabs forming an inner circle, and where each pilot tab of the plurality of pilot tabs is positioned directly behind a corresponding snap-fit arm of the plurality of snap-fit arms. In one example, the plurality of pilot tabs and the plurality of snap-fit arms of the shielding system are jointly configured to couple to a tone ring.

The system, according to the present disclosure, is a snap in style molded plastic shield that can be attached to the tone ring without tooling. The shield is configured in a way such that it comprises a circular ring cap with a central aperture.

A second side of the ring cap comprises multiple snap-fit arms arranged in a circle closer to a circumference of the ring cap. A portion of each snap-fit arm may be inserted into a corresponding groove and the rest of the portion of each snap-fit arm may be projected outside of the corresponding groove. Behind each snap fit arm, there exists an extended pilot tab that helps prevent over flexion of the respective snap fit arm in an inward direction. Each pilot tab may be located outside of the corresponding groove. The snap-fit arms and the pilot tabs are configured to be positioned on the second side of the ring cap in a way such that they appear to be arranged in concentric circles. The multiple snap-fit arms form an outer circle and the multiple pilot tabs form an inner circle. A first side of the ring cap includes multiple molding slides that are arranged circularly allowing a passage for oil flow.

The shield, according to the present disclosure, may be assembled into a tone ring during an installation of a tone ring assembly, in a way such that the tone ring traps a part of the shield. A plurality of curved holes along a circumference of the tone ring may be configured to accommodate the plurality of snap-fit arms and the plurality of pilot tabs of the shield, such that the shield gets coupled to the tone ring. In an assembled form, a portion of the tone ring appears to be resting on the plurality of snap-fit arms on the second side of the ring cap of the shield.

The shielding system of the present disclosure provides several advantages. It prevents metal to metal contact between a shaft and a tone ring during installation of an axle shaft in a vehicle axle. The axle shaft interfaces with the shield and through a press fit connection the tone ring, instead of interfacing with a bare tone ring. This reduces damages to the tone ring. Thus, the shielding system provides the tone ring with an ability to withstand reasonable axle shaft impact forces without fracture. Additionally, the shield acts as a guide/funnel to help center an axle shaft during installation. With the shield in place the tone ring is protected, and the shield creates a geometry that helps the axle shaft find the center of the tone ring to ease assembly of the axle shaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-5 are shown to scale, although other relative dimensions may be used if desired.

DETAILED DESCRIPTION

Figure 2:
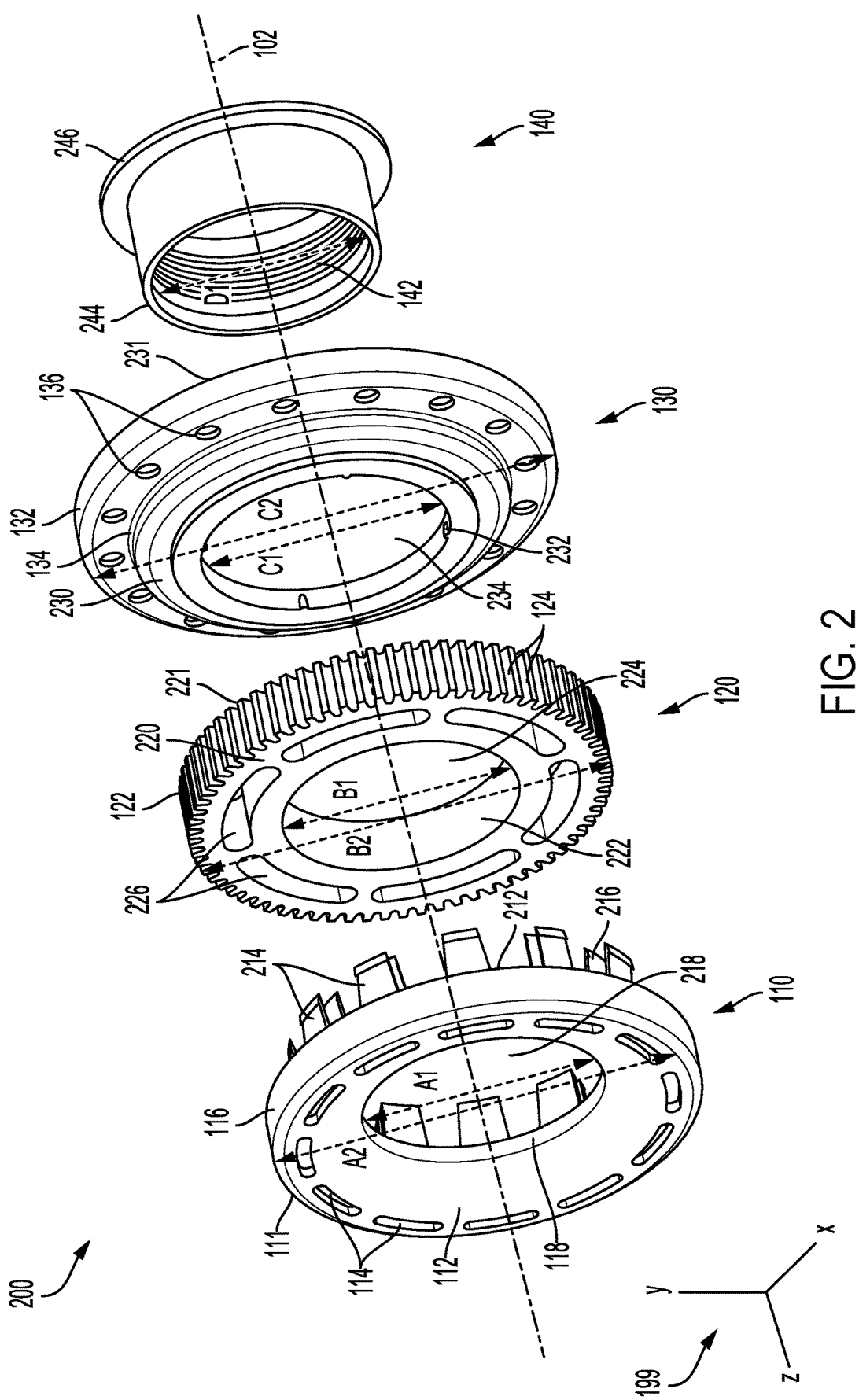
FIG. 2 shows an exploded view of the tone ring assembly of FIG. 1.
Figure 3B:
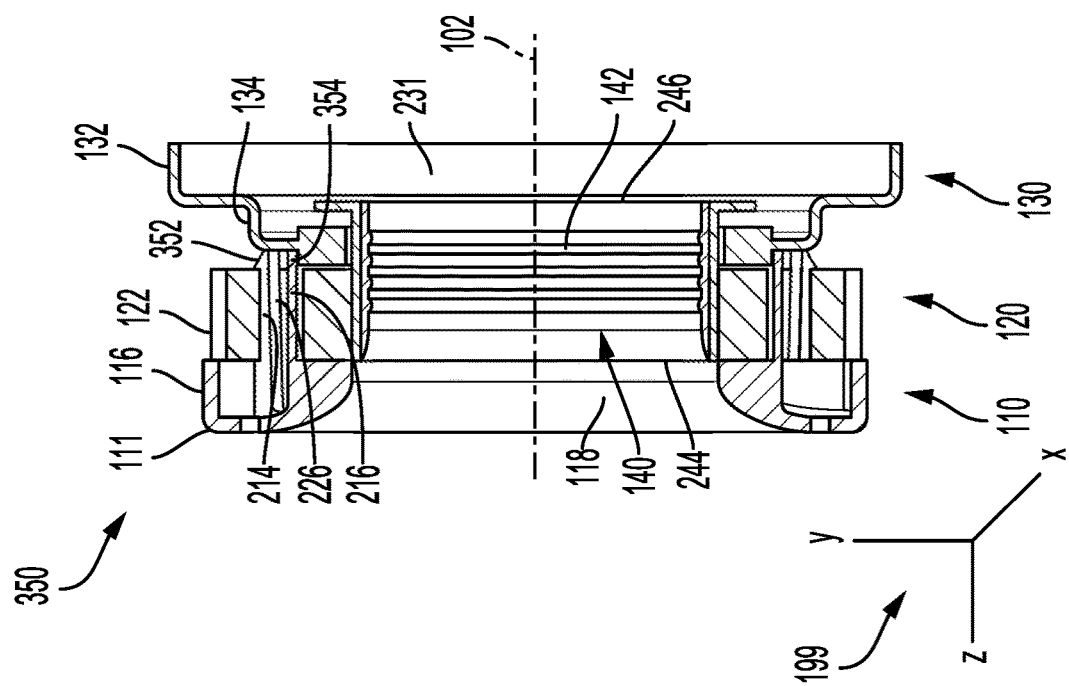
FIG. 3B shows a second cross-sectional view of the assembled tone ring assembly of FIG. 1, according to the present disclosure.
Figure 3A:
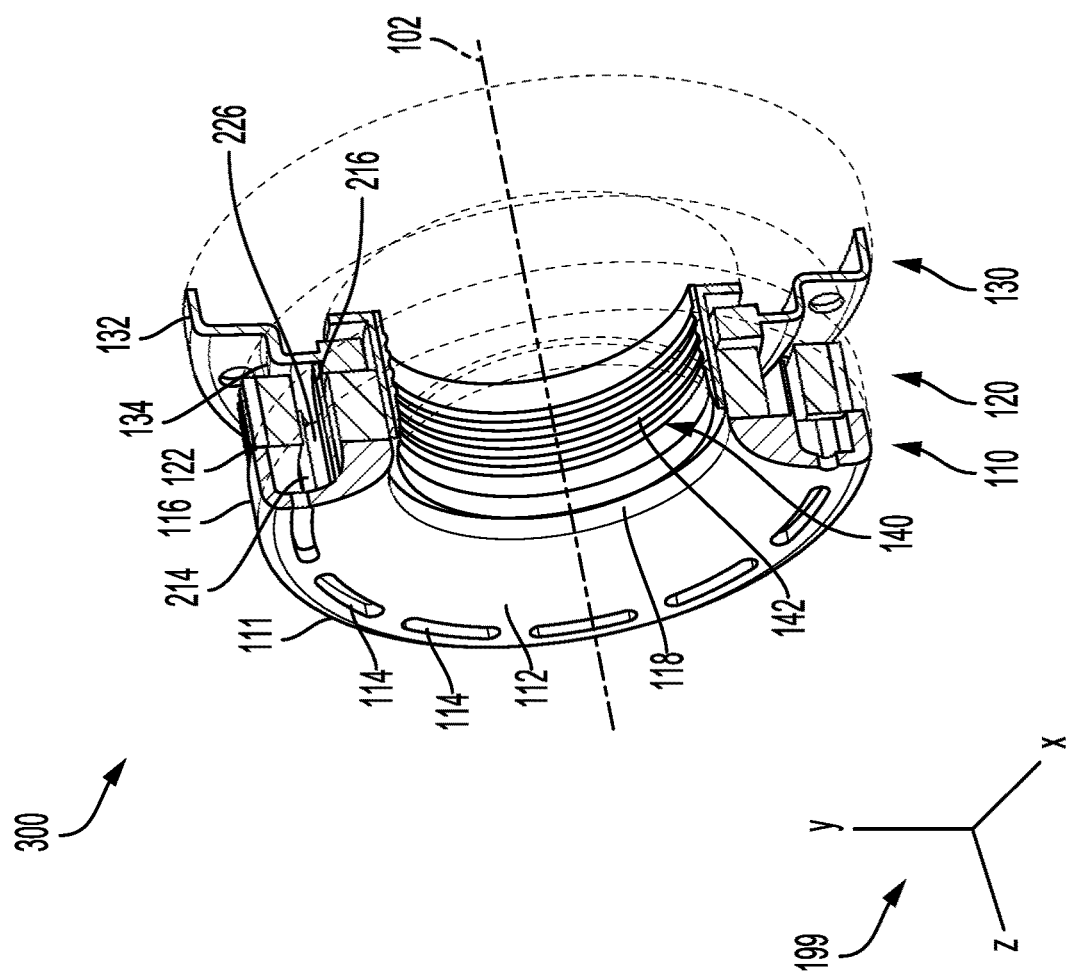
FIG. 3A shows a first cross-sectional view of the assembled tone ring assembly of FIG. 1, according to the present disclosure.
Figure 4:
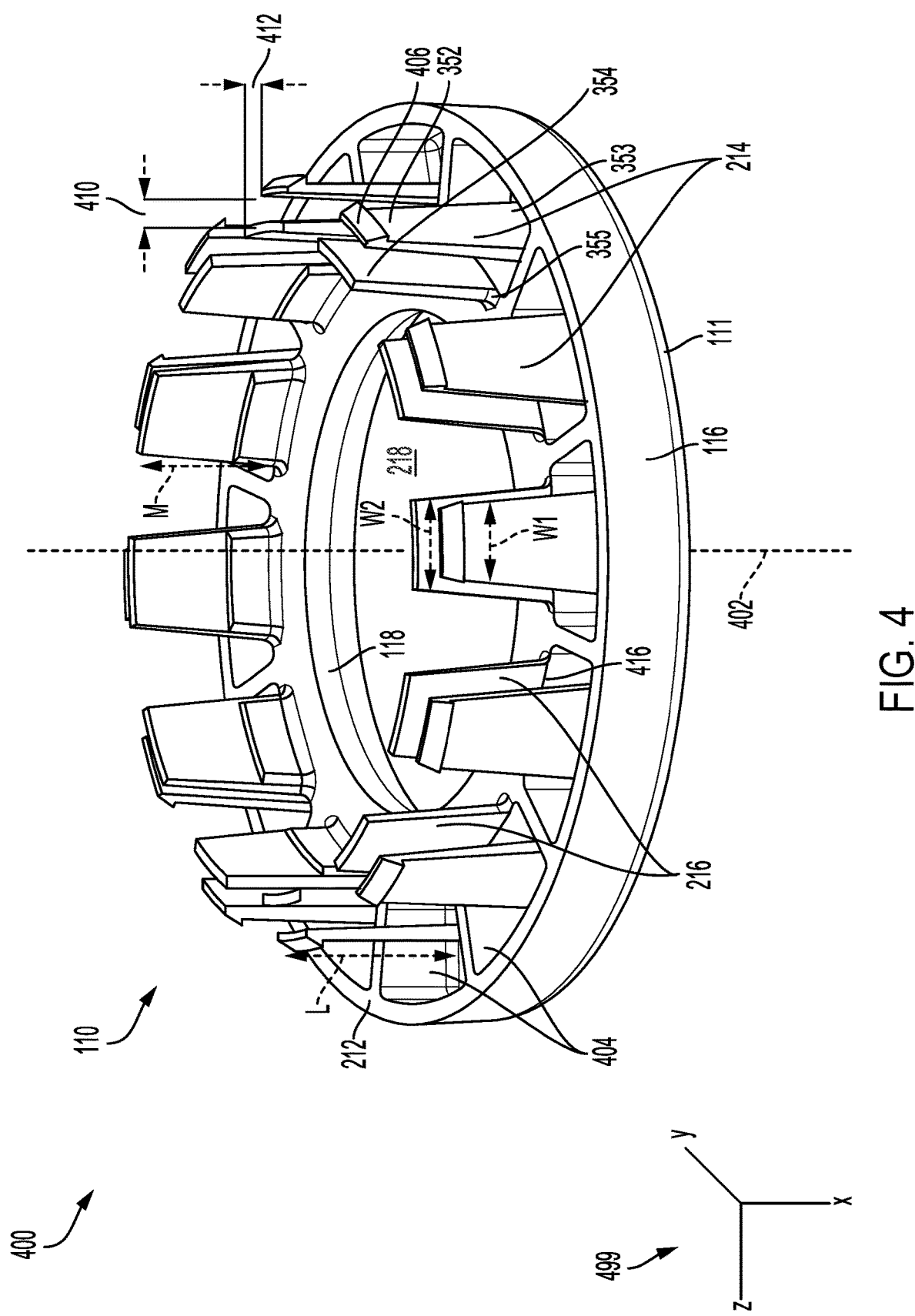
FIG. 4 shows a close-up bottom perspective view of a shield of the tone ring assembly, in accordance with an example of the present disclosure.
Figure 5:
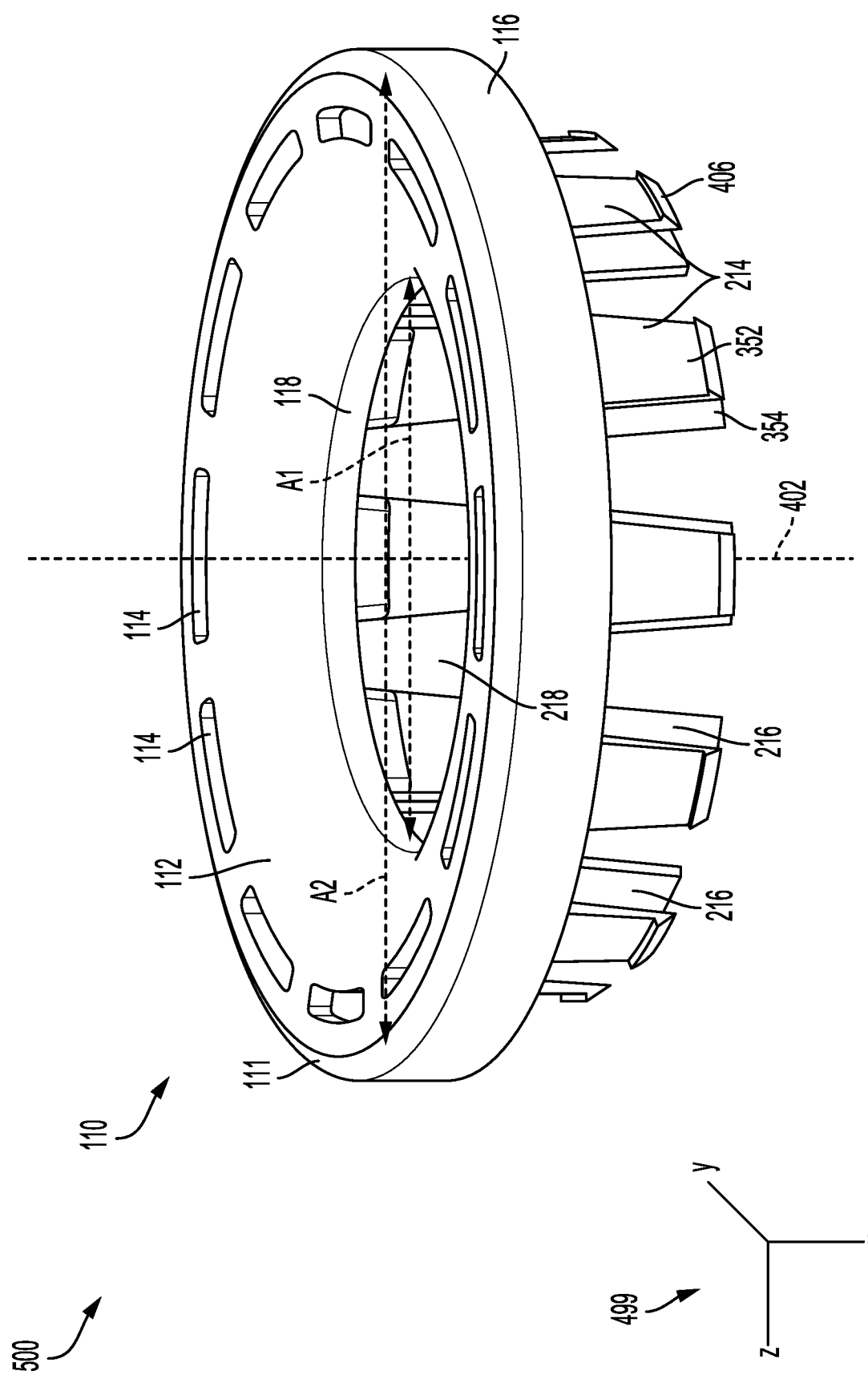
FIG. 5 shows a close-up top perspective view of the shield of the tone ring assembly, in accordance with an example of the present disclosure.

The following description relates to a shielding system for an axle tone ring that is configured to protect the tone ring from interfacing with an axle shaft. An exemplary tone ring assembly, according to the present disclosure, is shown in an assembled form in FIG. 1. FIG. 2 illustrates an exploded view of the tone ring assembly showing a plurality of component parts of the assembly. An engagement of four different component parts constitutes the tone ring assembly, according to the present disclosure. Cross-sectional views of the assembled tone ring assembly system are provided in FIGS. 3A-3B, showing the internal features of the assembly. FIGS. 4 and 5 illustrate a close-up bottom perspective view and a close-up top perspective view of the shield of the tone ring assembly, respectively, highlighting a variety of features in accordance with an example of the present disclosure.

Figure 1:
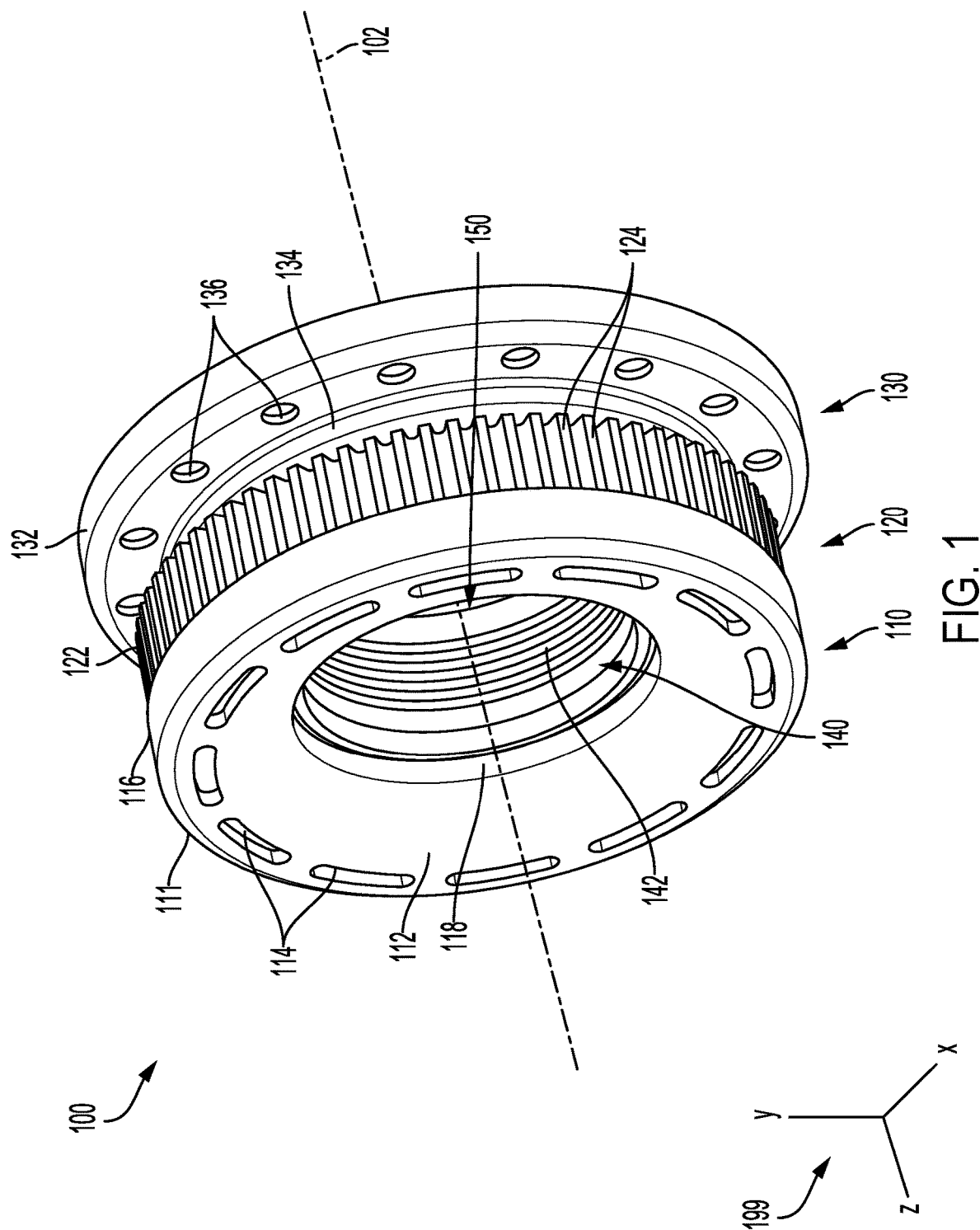
FIG. 1 shows a perspective view of an assembled tone ring assembly, according to the present disclosure.

FIG. 1 shows a perspective view of an exemplary tone ring assembly 100 in a fully assembled form. It will be appreciated that the tone ring assembly 100 may be used with any type of vehicle having a vehicle axle, such as commercial vehicles (light duty or heavy duty), sedans, trucks, pickup trucks, vans, SUVs, crossovers, hatchback, hybrid vehicles, sport utility vehicles, etc.

The tone ring assembly 100 comprises a tone ring shield 110, a tone ring 120, a ring cover 130, and a hollow cylindrical adjuster 140. The tone ring assembly 100, in an assembled form, also comprises a central hollow region 150 for installation of an axle shaft. A central longitudinal axis 102 of rotation of the tone ring assembly 100 is depicted by a dashed line for reference. The central axis 102 may be parallel to the z-axis of reference axes 199.

The tone ring shield 110 of the tone ring assembly 100 is a protective structure comprising a circular ring cap 111 with a central aperture. The ring cap 111 may have an outer circumferential edge 116 and an inner circumferential edge 118. A first side 112 of the ring cap 111 may include a plurality of molding slides 114 arranged in a circle closer to the outer circumferential edge 116. The plurality of molding slides 114 allows a passage for flow of oil. A second side of the ring cap 111, opposite the first, may include a plurality of pilot tabs and a plurality of snap-fit arms (not visible in FIG. 1) that may assist in coupling it to a tone ring. More details about the second side of the ring cap 111 and the coupling mechanism will be provided in FIGS. 3A-3B and FIG. 4.

The tone ring shield 110 may be a molded plastic cover that is configured to snap onto a tone ring assembly to protect a bare tone ring. The tone ring shield 110 may be made of a high impact polymeric material such as polyamide 6 (nylon). The polymeric material may be reinforced with fillers such as glass fiber/carbon fiber. This reinforced polymer matrix may provide increased strength, stiffness, resistance to abrasion, and thermal stability to the tone ring shield 110. The tone ring shield 110 is configured in a way such that, it specifically couples to a portion of a tone ring in order to protect it from interfacing with an axle shaft.

As shown in FIG. 1, the tone ring shield 110 is coupled to the tone ring 120 such that the tone ring 120 appears to be positioned adjacent to the second side of the ring cap 111. The tone ring 120 shows an outer circumferential edge 122 and a central aperture. As illustrated in FIG. 1, the outer circumferential edge 122 of the tone ring 120 comprises a plurality of teeth-like structures 124. In the assembled form, the outer circumferential edge 122 of the tone ring 120 aligns with the outer circumferential edge 116 of the ring cap 111 of the tone ring shield 110.

The ring cover 130 is shown to be positioned adjacent to the tone ring 120 in the tone ring assembly 100. The ring cover 130 may optionally comprise two circular sections, a first section having a first circumferential edge 132 and a second section having a second circumferential edge 134. The first section and the second section of the ring cover 130 are circumferentially offset from each other. The second section of the ring cover 130 may further comprise a plurality of holes arranged circularly along its circumference. The ring cover 130 also includes a central aperture. In the assembled form, none of the circumferential edges of the ring cover 130 aligns with the outer circumferential edge 122 of the tone ring 120. The presence of the ring cover 130 on one side of the tone ring 120 of the tone ring assembly 100 prevents incidental contact damage during installation of an axle shaft.

The hollow cylindrical adjuster 140 is a structure that holds all the component parts of the tone ring assembly 100 together. The hollow cylindrical adjuster 140 is configured to press fit through the central aperture of the ring cover 130 and the central aperture of the tone ring 120, as illustrated in FIG. 1. In other words, the ring cover 130 and the tone ring 120 are disposed around the hollow cylindrical adjuster 140 to form the tone ring assembly 100. Additionally, an inside of the hollow cylindrical adjuster 140 may include a threading 142. The threading 142 of the hollow cylindrical adjuster 140 allows the installation of an axle shaft through the central hollow region 150 of the tone ring assembly 100.

FIG. 2 shows an exploded view 200 of the tone ring assembly 100 of FIG. 1. As such, components previously introduced are numbered similarly in subsequent figures and not reintroduced for brevity. All the component parts of the tone ring assembly 100, including the tone ring shield 110, the tone ring 120, the ring cover 130, and the hollow cylindrical adjuster 140 and their geometrical features are completely visible in FIG. 2. All the component parts of the tone ring assembly are aligned along the central longitudinal axis 102 and the central longitudinal axis 102 may be parallel to the z-axis of reference axes 199.

As described previously in FIG. 1, the tone ring shield 110 comprises a ring cap 111 and a central aperture 218. The ring cap 111 has an outer circumferential edge 116 and an inner circumferential edge 118. The diameter of the ring cap 111 may be referred to as A2 and the diameter of the central aperture 218 may be referred to as A1. A first side 112 of the ring cap 111 includes a plurality of molding slides 114 arranged in a circle near the outer circumferential edge 116. As appreciated in FIG. 2, a second side 212 of the ring cap 111 includes a plurality of pilot tabs 216 and a plurality of snap-fit arms 214. The plurality of pilot tabs 216 and the plurality of snap-fit arms 214 are arranged in concentric circles on the second side 212 of the ring cap 111. The plurality of snap-fit arms 214 forms an outer circle and the plurality of pilot tabs 216 forms an inner circle. More details about the specific features of the second side 212 of the ring cap 111 will be provided in FIG. 4.

As described previously in FIG. 1, the tone ring 120 comprises an outer circumferential edge 122, an inner circumferential edge 222 and a central aperture 224. The diameter of the tone ring 120 may be referred to as B2 and the diameter of the central aperture 224 of the tone ring 120 may be referred to as B1. As appreciated by FIG. 2, the outer circumferential edge 122 of the tone ring 120 comprises a plurality of teeth-like structures 124, while the inner circumferential edge 222 of the tone ring 120 has a smooth surface. Additionally, the tone ring 120 has a first side 220 and a second side 221, opposite the first.

As depicted in FIG. 2, the tone ring 120 further comprises a plurality of curved holes 226 arranged circularly along a circumference of the tone ring 120. In the illustrated example, six curved holes are shown; however, in other examples, any suitable number of curved holes may be present along the circumference of the tone ring 120. The plurality of curved holes 226 of the tone ring 120 is configured to receive the plurality of snap-fit arms 214 and the plurality of pilot tabs 216 of the tone ring shield 110, when the second side 212 of the ring cap 111 of the tone ring shield 110 couples to the first side 220 of the tone ring 120. In the illustrated example, the coupling occurs in a way such that two adjacent snap-fit arms of the plurality of snap-fit arms 214 and two corresponding pilot tabs of the plurality of pilot tabs 216 mate with or insert into each curved hole of the plurality of curved holes 226. Said another way, a length of each curved hole is configured to accommodate two adjacent snap-fit arms of the plurality of snap-fit arms 214 and two corresponding pilot tabs of the plurality of pilot tabs 216. Additionally, a distance between two adjacent curved holes of the plurality of curved holes 226 is configured to be similar to a spacing between two adjacent pilot tabs of the plurality of pilot tabs 216. Furthermore, a width of each curved hole is configured to be slightly greater than a distance between each snap-fit arm and the corresponding pilot tab, such that it is wide enough to allow a pair of snap-fit arm and the corresponding pilot tab to be inserted into each curved hole.

In other examples, the plurality of curved holes 226 of the tone ring 120 may be configured in a way, such that only one snap-fit arm and the corresponding pilot tab may be inserted into each curved hole. In yet other examples, the plurality of curved holes 226 of the tone ring 120 may be configured in a way, such that more than two snap-fit arms and the corresponding pilot tabs may be inserted into each curved hole for coupling. In other embodiments, each curved hole of the plurality of curved holes 226 may be configured differently in order to accommodate different numbers of snap-fit arms and the corresponding pilot tabs.

As described previously in FIG. 1, the ring cover 130 comprises a first section having a first circumferential edge 132, a second section having a second circumferential edge 134, and a central aperture 234. The ring cover 130 also comprises an inner circumferential edge 232. The first and second sections of the ring cover 130 are circumferentially offset from each other. Additionally, the second section of the ring cover 130 may comprise a plurality of holes arranged circularly along its circumference. As depicted in FIG. 2, the ring cover 130 may have a diameter referred to as C2 and the central aperture 234 of the ring cover 130 may have a diameter referred to as C1. The ring cover 130 may have a first side 230 and a second side 231, opposite the first.

As shown in FIG. 2, the hollow cylindrical adjuster 140 comprises a first circumferential edge 244, a second circumferential edge 246, and a threading 142 on an inner circumference. The hollow cylindrical adjuster 140 may have a diameter D1. The second circumferential edge 246 is located opposite to the first circumferential edge 244 of the hollow cylindrical adjuster 140. The second circumferential edge 246 of the hollow cylindrical adjuster 140 may have an extended portion running along the entire circumferential edge.

The diameter A1 of the central aperture 218 of the tone ring shield 110, the diameter B1 of the central aperture 224 of the tone ring 120, and the diameter C1 of the central aperture 234 of the ring cover 130 may all be similar. Consequently, in an assembled tone ring assembly, the inner circumferential edge 118 of the tone ring shield 110, the inner circumferential edge 222 of the tone ring 120, and the inner circumferential edge 232 of the ring cover 130 all align with each other. In the illustrated example, the diameter D1 of the hollow cylindrical adjuster 140 is smaller than the diameters A1, B1, and C1. The smaller diameter of the hollow cylindrical adjuster 140 allows it to fit through the central aperture 234 of the ring cover 130 and the central aperture 224 of the tone ring 120, such that the ring cover 130 and the tone ring 120 are disposed around the hollow cylindrical adjuster 140, forming the tone ring assembly 100. In an assembled version, the tone ring shield 110 couples to the tone ring 120 via an interaction between the plurality of curved holes 226 of the tone ring 120 and the plurality of pilot tabs 216 and the plurality of snap-fit arms 214 of the tone ring shield 110.

In an assembled tone ring assembly, the second side 212 of the ring cap 111 of the tone ring shield 110 makes a face-sharing contact with the first side 220 of the tone ring 120. The second side 221 of the tone ring 120 makes a face-sharing contact with the first side 230 of the ring cover 130. This leads to an assembly, where the tone ring 120 is flanked by the tone ring shield 110 on the first side 220 of the tone ring 120 and by the ring cover 130 on the second side 221 of the tone ring 120, and the inner circumferential edge 222 of the tone ring 120 interfaces with the hollow cylindrical adjuster 140, such that no portions of the tone ring is available to contact with an axle shaft during installation. In the illustrated example, the diameter A2 of the tone ring shield 110 and the diameter B2 of the tone ring 120 are similar, while the diameter C2 of the ring cover 130 is larger than the diameters A2 and B2. In the assembled form of the tone ring assembly, the outer circumferential edge 116 of the tone ring shield 110 aligns with the outer circumferential edge 122 of the tone ring 120; however, the first circumferential edge 132 and/or the second circumferential edge 134 of the ring cover 130 do not align with the outer circumferential edges 116 and 122 of the tone ring shield 110 and the tone ring 120, respectively.

FIGS. 3A and 3B show a first cross-sectional view 300 and a second cross-sectional view 350 of the fully assembled tone ring assembly 100 of FIG. 1, respectively, revealing the internal structures according to the present disclosure. FIGS. 3A-3B are described herein collectively. The central longitudinal axis 102 of rotation of the tone ring assembly may be parallel to the z-axis of reference axes 199. Further, the first cross-sectional view 300 and the second cross-sectional view 350 shown in FIGS. 3A and 3B, respectively, are defined by an axial cut of the tone ring assembly of FIG. 1 in the y-z plane, as indicated by reference axes 199. The first cross-sectional view 300 and the second cross-sectional view 350 show an interior of the tone ring assembly system. The axial cut divides the system into two equal parts.

As depicted in FIGS. 3A-3B, the first cross-sectional view 300 and the second cross-sectional view 350 provide more details on the configuration of the engagement between the tone ring 120 and the tone ring shield 110. The plurality of curved holes 226 of the tone ring 120 shows the presence of the plurality of snap-fit arms 214 and the plurality of pilot tabs 216 of the tone ring shield 110. The tone ring 120 and the tone ring shield 110 are coupled together such that, the plurality of snap-fit arms 214 and the plurality of pilot tabs 216 of the tone ring shield 110 pass completely through the plurality of curved holes 226 of the tone ring 120. The plurality of snap-fit arms 214 and the plurality of pilot tabs 216 enter through the first side 220 of the tone ring 120 and exits through the second side 221 of the tone ring 120 along an entire circumference of the tone ring 120. This coupling mechanism provides ample number of attachment points, and an increased stability of the system. The tone ring shield 110 and the tone ring 120 are rotationally symmetric. Any of the snap-fit arm of the plurality of snap-fit arms 214 and the corresponding pilot tab may insert into any of the curved holes of the plurality of curved holes 226 of the tone ring 120.

As shown in FIGS. 3A-3B, each snap-fit arm of the plurality of snap-fit arms 214 makes contact with an upper surface of the curved hole and each pilot tab of the plurality of pilot tabs 216 makes contact with a lower surface of the curved hole of the tone ring 120. A first end 352 of each snap-fit arm and a first end 354 of each pilot tab extend beyond the curved hole on the second side 221 of the tone ring 120. On the second side 221 of the tone ring 120, the first end 352 of each snap-fit arm and the first end 354 of each pilot tab make contact with the first side 230 of the ring cover 130. Said another way, the second section of the ring cover 130 having the second circumferential edge 134 makes contact with the first end 352 of each snap-fit arm and with the first end 354 of each pilot tab.

Additionally, only the tone ring 120 and the second section of the ring cover 130 having the second circumferential edge 134 are disposed around the hollow cylindrical adjuster 140. The tone ring shield 110 is not disposed around the hollow cylindrical adjuster 140. Instead, the second side 212 of the ring cap 111 of the tone ring shield 110 makes a face-sharing contact with the first circumferential edge 244 of the hollow cylindrical adjuster 140. Furthermore, the extended portion of the second circumferential edge 246 of the hollow cylindrical adjuster 140 fits within the second section of the ring cover 130 having the second circumferential edge 134. This assists in keeping the ring cover 130 in place. Consequently, the first section of the ring cover 130 having the first circumferential edge 132 is disposed outside of the hollow cylindrical adjuster 140.

Turning to FIG. 4, a close-up bottom perspective view 400 of the tone ring shield 110 of the tone ring assembly 100 of FIG. 1 is provided. The close-up bottom perspective view 400 shows the features of the second side 212 of the ring cap 111 of the tone ring shield 110 in details. A central longitudinal axis 402 of rotation of the tone ring shield 110 is depicted by a dashed line for reference. The central axis 402 may pass through the central aperture 218 of the tone ring shield 110 and may be parallel to the x-axis of reference axes 499.

The second side 212 of the ring cap 111 of the tone ring shield 110 comprises a plurality of grooves 404, a plurality of snap-fit arms 214, and a plurality of pilot tabs 216. All these components are arranged circularly along an entire circumference of the ring cap 111 between the outer circumferential edge 116 and the inner circumferential edge 118.

Each groove of the plurality of grooves 404 has a shape of a trapezoid and is located closer to the outer circumferential edge 116 than the inner circumferential edge 118. In the illustrated example, each spacing between two consecutive grooves of the plurality of grooves 404 is configured to be equal. Each snap-fit arm of the plurality of snap-fit arms 214 originates inside a groove of the plurality of grooves 404, with an opposite end of the snap-fit arm projecting outside of the groove. Said another way, each snap-fit arm of the plurality of snap-fit arms 214 has two ends, a first end 352 and a second end 353, opposite the first. The second end 353 of each snap-fit arm attaches to the second side 212 of the ring cap 111 inside a corresponding groove of the plurality of grooves 404, while the first end 352 of each snap-fit arm projects outside of the corresponding groove. The shape of each snap-fit arm is configured in a way such that, it gradually tapers going from the second end 353 towards the first end 352. Consequently, the first end 352 of each snap-fit arm is narrower than the second end 353.

In the illustrated example, each snap-fit arm of the plurality of snap-fit arms 214 is located at the center of the respective groove. This provides a geometry where each spacing between two consecutive snap-fit arms of the plurality of snap-fit arms 214 is configured to be equal. This feature may provide an even load distribution, when a tone ring is coupled to the tone ring shield 110. Furthermore, the first end 352 of each snap-fit arm includes a hook 406, which is configured to counter the effects of snap-fit arm deflection and protect an attached tone ring during high speed centrifugal events.

Each snap-fit arm of the plurality of snap-fit arms 214 is positioned perpendicularly to the second side 212 of the ring cap 111. Each snap-fit arm of the plurality of snap-fit arms 214 may have a total length L. Approximately 70% of the length L along with the first end 352 of each snap-fit arm is located outside of the respective groove. The rest of the 30% of the length L along with the second end 353 of each snap-fit arm is inserted into the respective groove. The part of each snap-fit arm located outside of the groove is configured to mate with a tone ring, in a way such that a portion of the tone ring rests on this part of each snap-fit arm, when the tone ring is coupled to the tone ring shield 110 as illustrated in FIGS. 3A-3B. In an assembled tone ring assembly, such as shown in FIGS. 3A-3B, the first end 352 of each snap-fit arm including the hook 406 remains outside of a curved hole of the tone ring. The hook 406 of each snap-fit arm is configured to support the tone ring from a side opposite the side of the tone ring interacting with the ring cap 111.

As depicted in FIG. 4, behind each snap-fit arm of the plurality of snap-fit arms 214, there exists a pilot tab. Each pilot tab of the plurality of pilot tabs 216 is positioned exactly behind a snap-fit arm of the plurality of snap-fit arms 214. This provides a geometry, where the arrangement of the plurality of snap-fit arms 214 and the plurality of pilot tabs 216 appears to be in concentric circles along the circumference of the ring cap 111. The plurality of snap-fit arms 214 forms an outer circle and the plurality of pilot tabs 216 forms an inner circle.

Unlike snap-fit arms, each pilot tab of the plurality of pilot tabs 216 is located entirely outside of the respective groove of the plurality of grooves 404. Each pilot tab of the plurality of pilot tabs 216 has two ends, a first end 354 and a second end 355, opposite the first. The second end 355 of each pilot tab attaches to the second side 212 of the ring cap 111 outside of the respective groove. For example, the second end 355 of each pilot tab may be attached near an edge 416 of the respective groove behind each snap-fit arm. Thus, the second end 355 of each pilot tab is at an elevated level than the second end 353 of each snap-fit arm.

Each pilot tab of the plurality of pilot tabs 216 is positioned perpendicularly to the second side 212 of the ring cap 111 and parallel to the respective snap-fit arm of the plurality of snap-fit arms 214. The shape of each pilot tab is configured in a way such that, it gradually tapers going from the second end 355 towards the first end 354. Consequently, the first end 354 of each pilot tab is narrower than the second end 355. Unlike snap-fit arms, the first end 354 of each pilot tab of the plurality of pilot tabs 216 is devoid of a hook. In the illustrated example, each spacing between two consecutive pilot tabs of the plurality of pilot tabs 216 is configured to be equal. This feature may provide an even load distribution, when a tone ring is coupled to the tone ring shield 110.

Each pilot tab of the plurality of pilot tabs 216 may have a total length M. In the illustrated example, the length M of each pilot tab is smaller than the length L of each snap-fit arm. The entire length M of each pilot tab of the plurality of pilot tabs 216 is configured to mate with the plurality of curved holes 226 of a tone ring, when the tone ring is coupled to the tone ring shield 110 as illustrated in FIGS. 3A-3B. In an assembled tone ring assembly, such as shown in FIGS. 3A-3B, the first end 354 of each pilot tab remains outside of the curved hole of the tone ring and is configured to make contact with a ring cover on a side opposite the side of the tone ring that interacts with the ring cap 111.

As shown in FIG. 4, the plurality of snap-fit arms 214 and the plurality of pilot tabs 216 form a total of twelve snap-fit arm-pilot tab sets on the second side 212 of the ring cap 111 of the tone ring shield 110. In the illustrated example, the spacing 410 between each snap-fit arm and the corresponding pilot tab of each snap-fit arm-pilot tab set is configured to be equal. This key feature allows a strong and stable coupling of a tone ring with the tone ring shield 110. Furthermore, the first end 354 of each pilot tab is configured to be slightly extended than the first end 352 of each snap-fit arm and the extended region may be referred to as a region 412. This feature helps protect the plurality of snap-fit arms 214 from over flexion in an inward direction, when coupled to a tone ring. Furthermore, each snap-fit arm may have a width W1 and each pilot tab may have a width W2. In the illustrated example, the width W2 of each pilot tab is configured to be greater than the width W1 of each snap-fit arm. In other words, each pilot tab of the plurality of pilot tabs 216 is configured to be wider than each snap-fit arm of the plurality of snap-fit arms 214. This feature helps discourage a full finger access to the hook 406 of each snap-fit arm for flexion in an outward direction.

In the illustrated example, twelve grooves, twelve snap-fit arms, and twelve spatially corresponding pilot tabs are indicated. In other examples, the system may comprise any suitable number of grooves, snap-fit arms, and spatially corresponding pilot tabs on the second side 212 of the ring cap 111 of the tone ring shield 110. However, the number of grooves and snap-fit arms may be equal to the number of corresponding pilot tabs for enhanced coupling of the tone ring shield 110 and a tone ring. The use of multiple grooves, snap-fit arms, and spatially corresponding pilot tabs increases the number of attachment points, and thus, increases the stability of the system.

Turning to FIG. 5, a close-up top perspective view 500 of the tone ring shield 110 of the tone ring assembly 100 of FIG. 1 is provided. The close-up top perspective view 500 shows the features of the first side 112 of the ring cap 111 of the tone ring shield 110 in details. The central longitudinal axis 402 of rotation of the tone ring shield 110 is depicted by a dashed line for reference. The central axis 402 may pass through the central aperture 218 of the tone ring shield 110 and may be parallel to the x-axis of reference axes 499.

As appreciated by FIG. 5, the first side 112 of the ring cap 111 comprises a plurality of molding slides 114, which are essentially elongated holes that allow a passage for flow of oil. The plurality of molding slides 114 is arranged in a circle on the first side 112 of the ring cap 111 closer to the outer circumferential edge 116 than the inner circumferential edge 118. Each molding slide of the plurality of molding slides 114 aligns with the center of a groove of the plurality of grooves 404 present on the second side 212 of the ring cap 111. In other words, each molding slide of the first side 112 of the ring cap 111 forms an elongated hole in the respective groove of the plurality of grooves 404 on the second side 212 of the ring cap 111. The second end 353 of each snap-fit arm is configured to be attached to an edge of the respective molding slide inside each groove.

In the illustrated example, a total of twelve molding slides are present on the first side 112 of the ring cap 111. In other examples, however, the number of molding slides may vary depending on the number of grooves and snap-fit arms present on the second side 212 of the ring cap 111. The tone ring shield 110, according to the present disclosure, is configured in a way such that it comprises equal number of grooves, snap-fit arms, pilot tabs, and molding slides. This configuration of the tone ring shield provides stability to the system, when coupled to a tone ring in a tone ring assembly.

In this way, the shielding system or the tone ring shield of the present disclosure protects a tone ring in a tone ring assembly. The tone ring shield of the present disclosure provides several advantages. For example, it prevents metal to metal contact between a shaft and a tone ring, during installation of an axle shaft in a vehicle axle. This reduces damages to the tone ring. The present system provides the tone ring with an ability to withstand reasonable axle shaft impact forces without fracture. Additionally, the tone ring shield of the present disclosure acts as a guide/funnel to help center an axle shaft during installation. With the shield in place the tone ring is protected, and the shield creates a geometry that helps the axle shaft find the center of the tone ring to ease assembly of the axle shaft.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, reference axes 199 is included in FIGS. 1-3B and reference axes 499 is included in FIGS. 4-5 in order to compare the views and relative orientations described above. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in at least one example. FIGS. 1-5 are drawn approximately to scale, although other dimensions or relative dimensions may be used.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for shielding an axle tone ring, comprising:
a ring cap with a central aperture;
a plurality of snap-fit arms positioned on a second side of the ring cap;
a plurality of pilot tabs positioned on the second side of the ring cap, where the plurality of pilot tabs and the plurality of snap-fit arms are arranged in concentric circles; and
a plurality of molding slides positioned circularly on a first side of the ring cap.

2. The system of claim 1, wherein the plurality of snap-fit arms forms an outer circle and the plurality of pilot tabs forms an inner circle.

3. The system of claim 1, wherein the second side of the ring cap includes an equal number of the snap-fit arms and the pilot tabs.

4. The system of claim 3, wherein each pilot tab of the plurality of pilot tabs is positioned behind a corresponding snap-fit arm of the plurality of snap-fit arms.

5. The system of claim 1, wherein each snap-fit arm of the plurality of snap-fit arms is inserted into a corresponding groove of a plurality of grooves and each pilot tab of the plurality of pilot tabs is located outside of the corresponding groove of the plurality of grooves.

6. The system of claim 1, wherein each pilot tab of the plurality of pilot tabs is wider than each snap-fit arm of the plurality of snap-fit arms.

7. The system of claim 1, wherein a first end of each pilot tab extends beyond a first end of each snap-fit arm.

8. The system of claim 7, wherein the first end of each snap-fit arm includes a hook and the first end of each pilot tab is devoid of a hook.

9. The system of claim 1, wherein a second end of each snap-fit arm and a second end of each pilot tab are directly attached to the second side of the ring cap.

10. The system of claim 9, wherein the second end of each pilot tab is at an elevated level than the second end of each snap-fit arm.

11. The system of claim 1, wherein each molding slide of the plurality of molding slides allows a passage for flow of oil.

12. A tone ring assembly system for a vehicle axle, comprising:
a ring cover having a central aperture;
a tone ring positioned adjacent to a first side of the ring cover, the tone ring including a central aperture and a plurality of teeth circumscribing an outer surface;
a hollow cylindrical adjuster fitting through the central aperture of the ring cover and the central aperture of the tone ring; and
a tone ring shield positioned adjacent to a first side of the tone ring, the tone ring shield including:
a ring cap with a central aperture;
a plurality of snap-fit arms positioned on a second side of the ring cap;
a plurality of pilot tabs positioned on the second side of the ring cap, where the plurality of pilot tabs and the plurality of snap-fit arms are arranged in concentric circles; and
a plurality of molding slides circularly arranged on a first side of the ring cap,
where the second side of the ring cap of the tone ring shield is directly coupled to the tone ring via the plurality of snap-fit arms and the plurality of pilot tabs.

13. The system of claim 12, wherein the tone ring further comprises a plurality of curved holes along a circumference of the tone ring.

14. The system of claim 13, wherein the plurality of snap-fit arms and the plurality of pilot tabs of the tone ring shield mate with the plurality of curved holes of the tone ring.

15. The system of claim 12, wherein the plurality of snap-fit arms and the plurality of pilot tabs are oriented perpendicularly to the second side of the ring cap.

16. The system of claim 12, wherein each snap-fit arm is inserted into a corresponding groove of a plurality of grooves and each pilot tab is located outside of the corresponding groove of the plurality of grooves.

17. The system of claim 16, wherein the tone ring shield includes an equal number of the grooves, the snap-fit arms, the pilot tabs and the molding slides.

18. The system of claim 12, wherein each pilot tab of the plurality of pilot tabs is wider than each snap-fit arm of the plurality of snap-fit arms, and wherein a first end of each snap-fit arm includes a hook and a first end of each pilot tab is devoid of a hook.

19. A tone ring shield for a vehicle axle, comprising:
a ring cap having a central aperture;
a plurality of molding slides arranged circularly on a first side of the ring cap, each molding slide allowing a passage for oil flow;

a plurality of snap-fit arms positioned on a second side of the ring cap, each snap-fit arm inserted into a corresponding groove of a plurality of grooves; and a plurality of pilot tabs positioned on the second side of the ring cap, each pilot tab located outside of the corresponding groove of the plurality of grooves, wherein the plurality of pilot tabs and the plurality of snap-fit arms are arranged in concentric circles with the plurality of snap-fit arms forming an outer circle and the plurality of pilot tabs forming an inner circle, where each pilot tab of the plurality of pilot tabs is positioned behind a corresponding snap-fit arm of the plurality of snap-fit arms, and where the plurality of pilot tabs and the plurality of snap-fit arms are jointly configured to couple to a tone ring.

20. The tone ring shield of claim 19, wherein the plurality of snap-fit arms and the plurality of pilot tabs are oriented perpendicularly to the second side of the ring cap, and wherein a second end of each snap-fit arm of the plurality of snap-fit arms is attached to an edge of a corresponding molding slide of the plurality of molding slides.

\* \* \* \* \*